United States Patent
Oettinger

(10) Patent No.: US 7,039,321 B2
(45) Date of Patent: May 2, 2006

(54) METHOD OF CONTROLLING ALIGNMENT OF AN OPTICAL WIRELESS COMMUNICATION LINK

(75) Inventor: Eric G. Oettinger, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 645 days.

(21) Appl. No.: 10/118,789

(22) Filed: Apr. 9, 2002

(65) Prior Publication Data

US 2002/0154365 A1    Oct. 24, 2002

Related U.S. Application Data

(60) Provisional application No. 60/285,461, filed on Apr. 20, 2001, provisional application No. 60/285,460, filed on Apr. 20, 2001.

(51) Int. Cl.
*H04B 10/00*    (2006.01)

(52) U.S. Cl. ..................................... 398/129; 398/122
(58) Field of Classification Search ......... 398/118–131
See application file for complete search history.

(56) References Cited

U.S. PATENT DOCUMENTS

6,590,685 B1 * 7/2003 Mendenhall et al. ....... 398/121

* cited by examiner

*Primary Examiner*—Agustin Bello
(74) *Attorney, Agent, or Firm*—William B. Kempler; W. James Brady, III; Frederick J. Telecky, Jr.

(57) ABSTRACT

A method that allows an optical wireless communication link between transmitting and receiving stations to be established and used reliably without the need for position sensing capabilities. A small random nudge of the center of the acquisition spiral is used to prevent a link from being established before proper alignment is attained or to correct the alignment of an established link which does not have sufficient alignment to maintain a high bandwidth link.

9 Claims, 1 Drawing Sheet

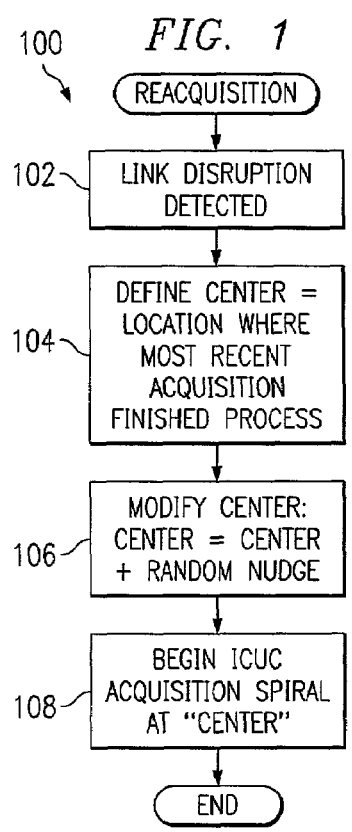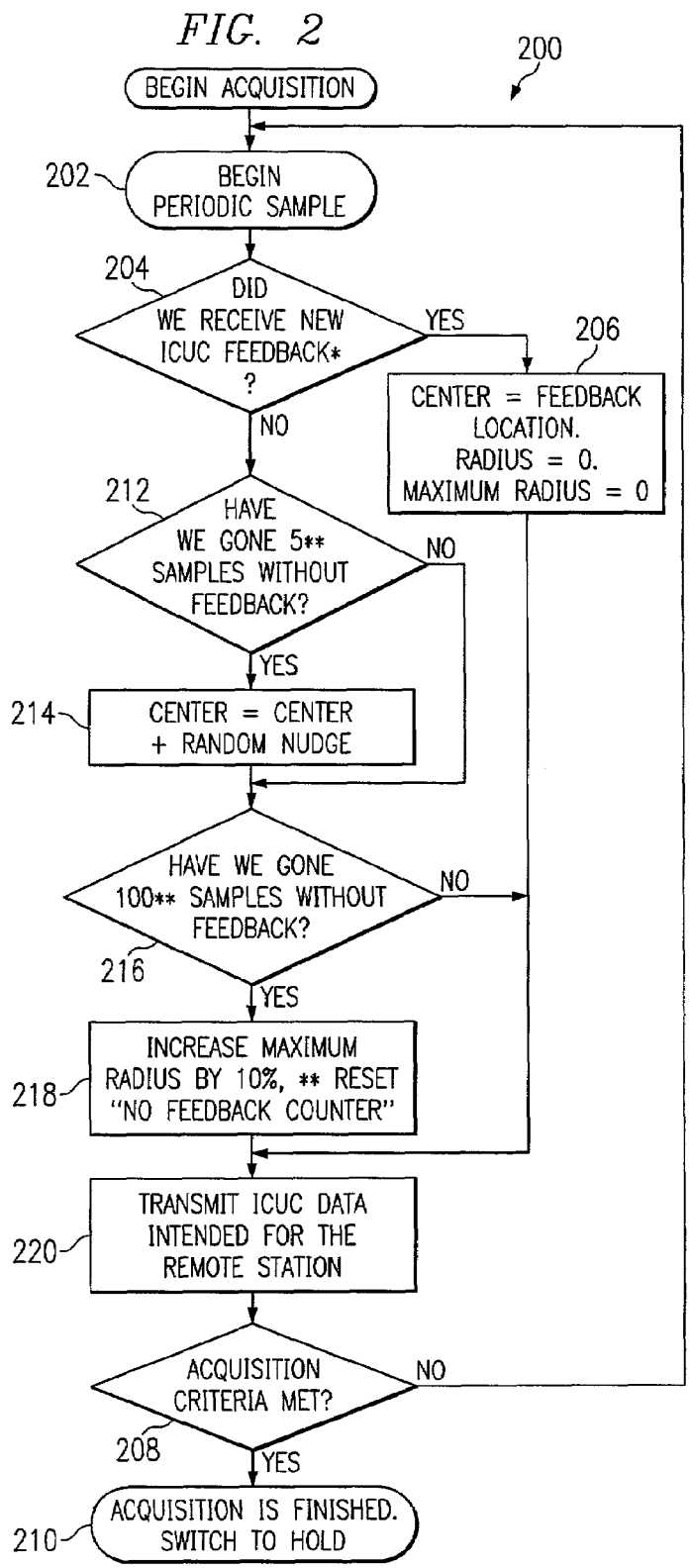

METHOD OF CONTROLLING ALIGNMENT OF AN OPTICAL WIRELESS COMMUNICATION LINK

RELATED APPLICATIONS

This patent application is related to U.S. patent application Ser. No. 09/940,763, entitled Method And Apparatus For Aligning Optical Wireless Link, filed on Aug. 27, 2001 by Heminger et al., claiming benefit of Provisional Application Ser. No. 60/285,461, filed on Apr. 20, 2001; and also U.S. patent application Ser. No. 09/942,265, entitled Method And Apparatus For Re-Acquisition After Link Disruption In An Optical Wireless Link, filed on Aug. 27, 2001 by Oettinger et al., claiming benefit of Provisional Application Ser. No. 60/285,460, filed on Apr. 20, 2001.

BACKGROUND OF THE INVENTION

1. Field of the Invention

This invention relates generally to wireless communications systems, and more particularly, to a method of controlling alignment of an optical wireless communication link between an optical transmitting station (transceiver) and an optical receiving station (transceiver) which are not capable of sensing positional information of the remote station's beam relative to the local station's detector.

2. Description of the Prior Art

An optical wireless link system comprises at least two stations, each of which contains an optical transmitter (or transceiver) and an optical receiver (or transceiver). The transmitter is able to change the direction of its transmitted beam by known amounts of angular displacement. The receiver generally sees this motion and sends position correction information back to the transmitter.

In some instances however, the receiver is not equipped with any position sensing capability to detect the positioning accuracy of the incident beam relative to the receiving station detector. In such systems, active tracking between stations is not typically employed; rather, the stations will switch to a "hold" mode, where the direction of the beam is held constant once a link is established. In order to establish the link (a procedure termed "acquisition"), such architectures must rely solely on binary feedback in which a sample was received or it was not received (either the beam is aligned with the receiving station data detector or it is not so aligned). This is problematic since some feedback may be detected by the receiving station as soon as the beam is close to the receiving station's data detector (i.e. locking onto the "halo" or edge of the laser). Ideally, the beam should be centered on the detector since the center is brighter (higher SNR), and the system will be more immune to slight vibrations. Once the foregoing feedback is detected, some method must be used to determine if further adjustment is necessary, or if the alignment is sufficient for data communication. In one method, the acquisition spiral may be continued until the alignment is good enough to meet some predefined criteria (e.g. 100 samples in a row). If the alignment is slightly off center, however, it will likely be incapable of transferring data at a high rate due to insufficient alignment. The poor data rate may trigger the need for a "re-acquisition". Such techniques may then switch back and forth between the acquisition and hold modes, without ever establishing a good data link.

In view of the foregoing, it would be desirable and advantageous in the optical wireless communication art to provide a technique that allows an optical wireless communication link to be used reliably without the need for position sensing capabilities.

SUMMARY OF THE INVENTION

The present invention is directed to a method of controlling alignment of an optical wireless communication link between two optical transceivers. The method allows an optical wireless communication link between the stations to be used reliably without the need for position sensing capabilities simply by modifying acquisition and re-acquisition algorithms such as those defined in U.S. patent application Ser. No. 09/940,763 and U.S. patent application Ser. No. 09/942,265 referenced herein before. The '763 and '265 patent applications are assigned to Texas Instruments Incorporated, the assignee of the present application, and are incorporated by reference in their entirety herein. Randomly modifying the center of the acquisition spiral that is used for a scan pattern by a small amount (for example, a fraction of the beam divergence) has the effect of moving away from locations where the alignment is sufficient to feedback some positional data, but not enough to provide a high bandwidth link. "Sensorless acquisition" has been successfully demonstrated by the present inventor at distances ranging from 1 to 50 meters using this random nudge technique. This random nudge technique can be used at different times during the wireless communication process.

In one aspect of the invention, a method of controlling alignment of an optical wireless communication link between an optical transmitting station and an optical receiving station is implemented by randomly adjusting the center of the spiral used for a scan pattern during the final signal acquisition cycle. Using this aspect, the initial alignment between the stations can be performed at a much faster rate. For example, by applying the nudge if more than a couple samples in a row are missed, the algorithm will not dwell in locations which have poor error rates.

In another aspect of the invention, a method of controlling alignment of an optical wireless communication link between an optical transmitting station and an optical receiving station is implemented by randomly adjusting the starting point of the center of the spiral used for a scan pattern during a signal re-acquisition cycle. Using this aspect, will prevent the stations from the endless cycle between "hold" and "acquisition".

BRIEF DESCRIPTION OF THE DRAWINGS

Other aspects, features and advantages of the present invention will be readily appreciated, as the invention becomes better understood by reference to the following detailed description when considered in connection with the accompanying drawing figures wherein:

FIG. 1 is a flowchart depicting a method of controlling alignment of an optical wireless communication link between an optical transmitting station and an optical receiving station without using position sensing and feedback information by randomly adjusting the center of the acquisition spiral used for a scan pattern "during a signal re-acquisition process" according to one embodiment of the present invention; and FIG. 2 is a flowchart depicting a method of controlling alignment of an optical wireless communication link between an optical transmitting station and an optical receiving station without using position sensing and feedback information by randomly adjusting the center of the acquisition spiral used for a scan pattern "during a signal acquisition process" according to one embodiment of the present invention.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments are best explained by first considering the case in which the transmitting and receiving units have first completed a coarse acquisition process. During the coarse acquisition process, signals are monitored to determine if any new feedback information is received. This feedback information may be monitored using an "ICUC" ("I see, you see") acquisition spiral which spirals in and out, transmitting both its local position as it goes, along with the most recent value of the remote that it has seen. The spiral is therefore transmitting what "I see" and the remote is transmitting what "you see". Upon completion of the coarse acquisition, a determination must then be made as to when the receiving stations should drop into a "hold" mode. Since positioning accuracy cannot be monitored, some other criteria must be used to make this determination. Continued use of the ICUC spiral acquisition method until a predetermined number of consecutive sightings count is reached can be used to program the units into their "hold" modes.

The approach described herein above is problematic since the laser can be aligned well enough to get the required "consecutive samples", but not well enough to reliably transmit high bandwidth data. For example, if the error rate is 1/100, it is likely to perform a lock with little problem; but the data throughput would be poor.

In the "hold" mode, the units assume that the lock has been lost after some number of missed samples; and the units attempt to re-acquisition. This re-acquisition would proceed, starting in the last known good location. The foregoing method may easily end up in a cycle where a solid lock with a good data rate is never achieved.

The present method of controlling alignment of an optical wireless communication link between an optical transmitting station and an optical receiving station however, does not use the last known good location as a starting point for the scan in order to acquire or re-acquire a "lock". In stead, a small random nudge of the center of the acquisition spiral used for a scan pattern is added to the last "good" position; and then the scan begins from that point. "Sensorless acquisition" has been successfully demonstrated by the present inventor at distances ranging from 1 to 50 meters using this random nudge technique. This random nudge technique can be used at different times during the wireless communication process. The initial alignment between the transmitting and receiving stations, for example, can be improved at a much faster rate; and the endless cycle between "hold" and "acquisition" modes can be avoided simply by using this technique during a final acquisition at which time a random adjustment of the center of the scan pattern can be made, for example, if more than a couple samples in a row are missed.

An alternative approach might be to restart the scan from the center, but this approach will be even slower, especially if the initial alignment is poor. Further, if the receiving station is locking onto the "halo", it will consistently find the "halo" instead of the beam, since the "halo" precedes the beam in its motion.

Looking now at FIG. 1, a flow chart shows a method 100 of controlling alignment of an optical wireless communication link between an optical transmitting station and an optical receiving station without using position sensing and feedback information, but instead randomly adjusts the center of the acquisition spiral used for a scan pattern during a signal re-acquisition process according to one embodiment of the present invention. This embodiment is useful immediately following any known course acquisition process such as the "ICUC" acquisition technique discussed herein before.

When the transmitting and receiving stations have completed a coarse signal acquisition, for example, some criteria other than that related to positioning accuracy is monitored to determine whether the stations should drop into a "hold" mode, since positioning accuracy information is no longer available.

With continued reference to FIG. 1, the process can be seen to begin upon detection of a link disruption 102; at which time the process starts from the last known good location, with a small radius as shown in block 104. A small nudge of the starting point is then implemented to remove any lock-up conditions as depicted in block 106. The small nudge is most preferably implemented right on the border of close enough to lock, but far enough away that it keeps going through re-acquire. The re-acquisition process then continues by commencing the ICUC acquisition spiral at the new center as shown in block 108.

FIG. 2 is a flowchart depicting a method 200 of controlling alignment of an optical wireless communication link between an optical transmitting station and an optical receiving station without using position sensing and feedback information by randomly adjusting the center of the acquisition spiral used for a scan pattern "during a signal acquisition process" according to one embodiment of the present invention. The process can be seen to begin by periodically sampling a signal stream to make a determination of whether there is new ICUC feedback information in the packet as seen in blocks 202 and 204. If new feedback information is present, the spiral size is collapsed and a determination is made as to whether the position is close to the final position or still away from the final position. If the position is still far away from the final position, the center of the spiral is set to the last seen position and the signal acquisition continues from that point by resetting the radius to spiral from its new center as seen in block 206. This process continues until a predetermined acquisition criterion is met (i.e. a desired number of contiguous samples is received) as depicted in block 208, at which time the acquisition is finished, and the link is switched into a "hold" state such shown in block 210. If after periodic sampling however, a determination is instead made that no new ICUC feedback information has been received, a further determination is made as to whether just a few samples (i.e. 5 samples) have been received without feedback as shown in block 212. If a determination has been made that such a few samples have been received without any new ICUC feedback information, the center of the ICUC spiral is nudged in a random direction, and the acquisition continues from that point as depicted in block 214. If a further determination is then made regarding yet a different acquisition criteria, i.e. whether a greater number of samples (i.e. 100) have been received without any new ICUC feedback information using the new center, then the maximum radius of the ICUC acquisition spiral is increased by a predetermined amount, i.e. 10%, and a "No Feedback Counter" is reset to zero as depicted in blocks 216 and 218. Subsequent to increasing the maximum radius and resetting the "No Feedback Counter", the acquisition continues and transmitted ICUC data is intended for the remote station as shown in block 220. A final determination is then made as to whether a predetermined acquisition criterion is met as shown in block 208. If the predetermined acquisition criteria are in fact met, then the acquisition process is finished and the communication link is put into a "hold" state as depicted in block 210. If the predetermined acquisition criteria have not been met, the acquisition process loops back and starts from the beginning as depicted in blocks 202 and 208. Looking again at block 216, if a determination has been made that the different acquisition criteria has not been met, i.e. whether a greater number (i.e. 100) of samples, have not been received without any new ICUC feedback information using the new center, then the acquisition process continues without either increasing the maximum ICUC spiral radius or resetting the "no Feedback Counter"; and transmitted ICUC data is again intended for the remote station as shown in block 220. A final determination is then similarly made as to whether a predetermined acquisition criterion is met as shown in block 208. If the predetermined acquisition criteria is in fact met, then the acquisition process is similarly finished and the communication link is put into a "hold" state as seen in block 210. If the predetermined acquisition criteria have not been met, the acquisition process loops back and starts from the beginning as depicted in blocks 202 and 208.

In summary explanation, a method allows an optical wireless communication link between the transmitting and receiving stations to be used reliably without the need for position sensing capabilities. A small random nudge of the center of the acquisition spiral that is used for a scan pattern is added to the last "good" position; and then the scan begins from that point. The method can be used at different times during a communication link, including but not limited to, during final acquisition and/or re-acquire modes.

In view of the above, it can be seen the present invention presents a significant advancement in the art of optical wireless link control techniques. Further, this invention has been described in considerable detail in order to provide those skilled in the optical wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of signal acquisition over an optical wireless communication link comprising randomly adjusting an acquisition scan pattern, such that final alignment is achieved in a shorter period of time than that achievable without application of the random scan pattern adjustment, and further such that the final alignment is improved beyond that achievable without application of the random scan pattern adjustment, wherein the step of randomly adjusting a scan comprises the steps of:

(a) periodic sampling of the optical wireless communication link during a final signal acquisition cycle to detect the absence of new feedback information;

(b) determining whether a first predetermined number of samples has been received without new feedback information to define a first signal acquisition condition;

(c) determining a location associated with an acquisition spiral at which the most recent acquisition transpired prior to any occurrence of the first signal acquisition condition;

(d) modifying the location with a nudge in a random direction to define a new center associated with the acquisition spiral subsequent to any occurrence of the first signal acquisition condition;

(e) acquiring data signals using an acquisition spiral having the new center to determine whether a second predetermined number of samples have been received without new feedback information to define a second signal acquisition condition subsequent to any occurrence of the first signal acquisition condition; otherwise (f) acquiring data signals using the acquisition spiral having a desired scan pattern without a newly defined center in the absence of the first signal acquisition condition to determine whether a second predetermined number of samples have been received without new feedback information to define a second signal acquisition condition;

(g) increasing the maximum radius associated with the acquisition spiral having the new center by a predetermined amount upon the occurrence of the second signal acquisition condition;

(h) acquiring data signals with the acquisition spiral having the new center and the increased maximum radius to determine if a predetermined acquisition criteria has been met upon the occurrence of the second signal acquisition condition; otherwise (i) acquiring data signals with the acquisition spiral determined in step (f) to determine if a predetermined acquisition criterion has been met upon the absence of the second signal acquisition condition;

(j) repeating steps (a)–(i) when the acquisition criteria has not been met; and (k) halting the random adjustment of the scan pattern and continuously acquiring data signals using the most recent acquisition spiral determined in steps (g) and (h) when the acquisition criteria has been met.

2. A method of signal acquisition over an optical wireless communication link comprising randomly adjusting an acquisition scan pattern, such that final alignment is achieved in a shorter period of time than that achievable without application of the random scan pattern adjustment, and further such that the final alignment is improved beyond that achievable without application of the random scan pattern adjustment, detecting the occurrence of an optical link disruption;

randomly adjusting a scan pattern associated with a signal acquisition spiral upon detection of the link disruption such that the optical wireless communication link is re-aligned in response to the randomly adjusting scan pattern to re-acquire the optical wireless communication link; determining a location associated with the signal acquisition spiral at which the most recent signal acquisition transpired prior to the occurrence of the link disruption; and modifying the location with a nudge in a random direction to define a new center associated with the acquisition spiral.

3. The method according to claim 2 wherein the step of randomly adjusting the scan pattern further comprises acquiring data signals using the signal acquisition spiral having the new center defined each time a link disruption is detected.

4. The method according to claim 2 wherein the step of modifying the location with a nudge in a random direction to define a new center associated with the acquisition spiral comprises randomly nudging a commanded position in a rotary fashion defined in terms of milli-radians (mrad).

5. The method according to claim 4 wherein the step of randomly nudging a commanded position in a rotary fashion comprises randomly nudging the commanded position in the range of about 1/128 to about 1/16 mrad.

6. A method of signal acquisition in a optical wireless communications link comprising:
  searching for a signal receiver utilizing a predetermined scan pattern having a center;
  determining that a predetermined number of samples has been missed,
  nudging the center of the predeteremined scan pattern in a random direction to a new center;
  continuing the search utilizing the new center.

7. The method of claim 6 wherein the predetermined scan pattern is a spiral.

8. The method according to claim 7 wherein the center of an acquisition spiral is adjusted during a final signal acquisition cycle upon the absence of new feedback information defined by at least two missed samples in a row.

9. The method according to claim 6 wherein the step of randomly adjusting a scan pattern comprises the steps of:
  (a) periodic sampling of the optical wireless communication link during a final signal acquisition cycle to detect the reception of new feedback information;
  (b) determining a feedback location associated with an acquisition spiral used to acquire the most recent new feedback information to define a new center associated with the acquisition spiral;
  (c) acquiring data signals using an acquisition spiral having the new center to generate newly acquired data signals;
  (d) determining from the newly acquired data signals whether a predetermined acquisition criterion has been met;
  (e) repeating steps (a)–(d) each time new feedback information is detected during periodic sampling and the acquisition criteria has not been met; and
  (f) halting the random adjustment of the scan pattern to continuously acquire data signals using the acquisition spiral having the new center when the acquisition criteria have been met.

* * * * *